No. 822,966. PATENTED JUNE 12, 1906.
F. A. LUNDQUIST.
CALLING DEVICE FOR TELEPHONE EXCHANGES.
APPLICATION FILED FEB. 6, 1905.

3 SHEETS—SHEET 1.

Witnesses:—
H. A. Redfield
Thomas Hawkes

Inventor:—
Frank A. Lundquist
By Casper L. Redfield
Attorney

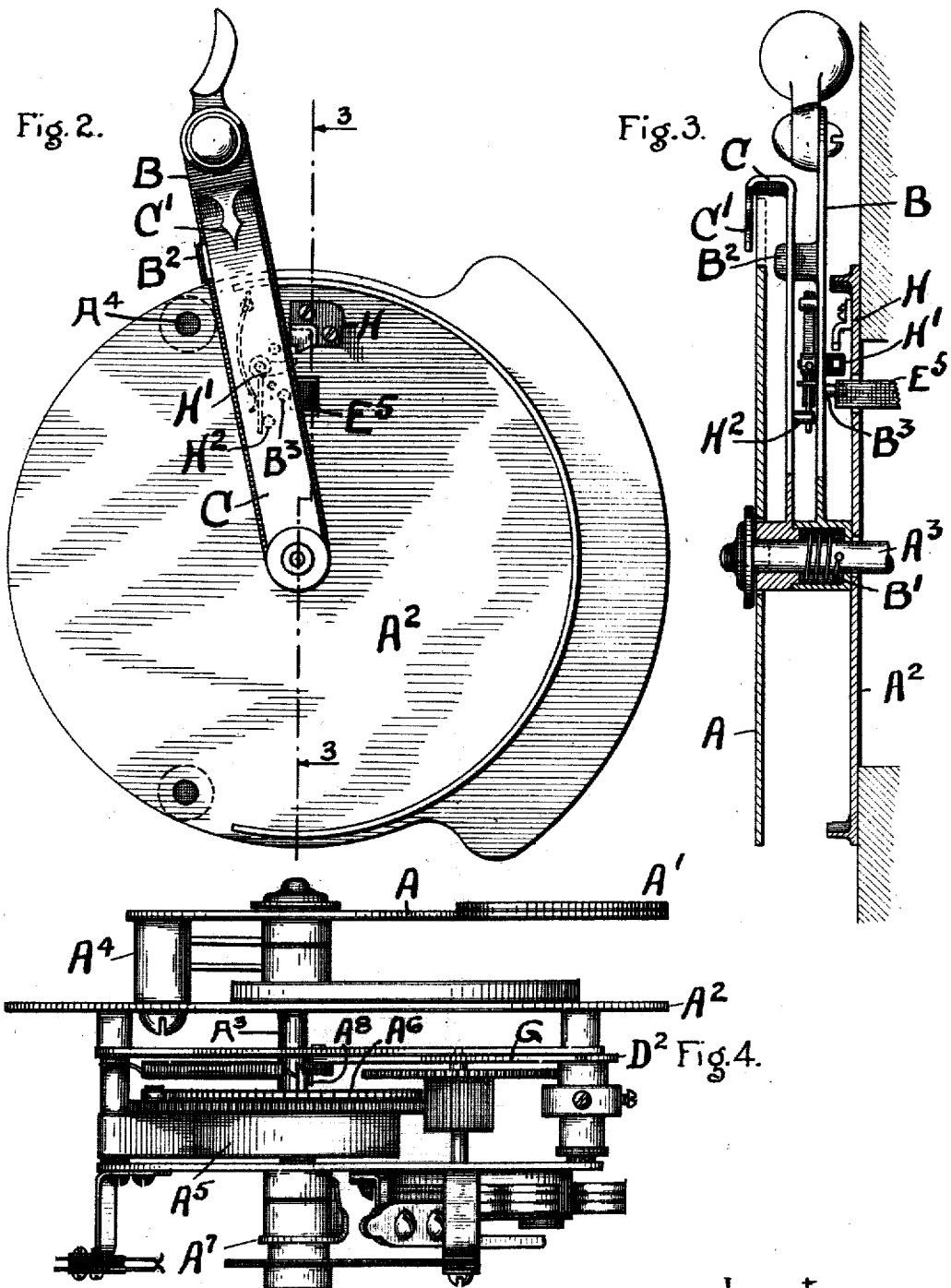

No. 822,966. PATENTED JUNE 12, 1906.
F. A. LUNDQUIST.
CALLING DEVICE FOR TELEPHONE EXCHANGES.
APPLICATION FILED FEB. 6, 1905.

3 SHEETS—SHEET 3.

Witnesses:
H. A. Redfield
Thomas Hawkes

Inventor:
Frank A. Lundquist
By Casper L. Redfield
Attorney.

UNITED STATES PATENT OFFICE.

FRANK A. LUNDQUIST, OF CHICAGO, ILLINOIS.

CALLING DEVICE FOR TELEPHONE-EXCHANGES.

No. 822,966.　　Specification of Letters Patent.　　Patented June 12, 1906.

Application filed February 6, 1905. Serial No. 244,344.

*To all whom it may concern:*

Be it known that I, FRANK A. LUNDQUIST, a citizen of the United States of America, and a resident of Chicago, county of Cook, and State of Illinois, have invented certain new and useful Improvements in Calling Devices for Telephone-Exchanges, of which the following is a specification.

My invention relates to calling devices for automatic telephone-exchanges, and has for its object improvements in the construction and operation of such exchanges.

Figure 1:
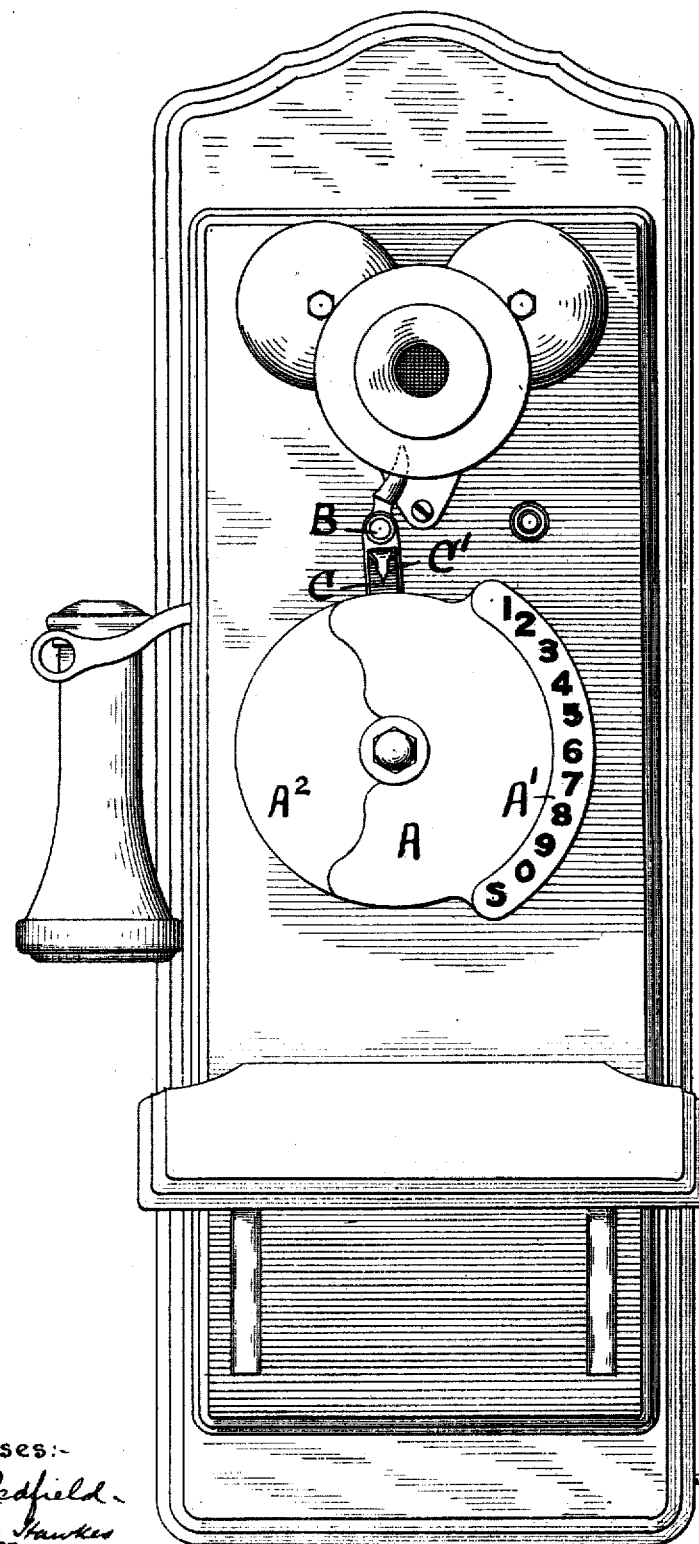
Figure 5:
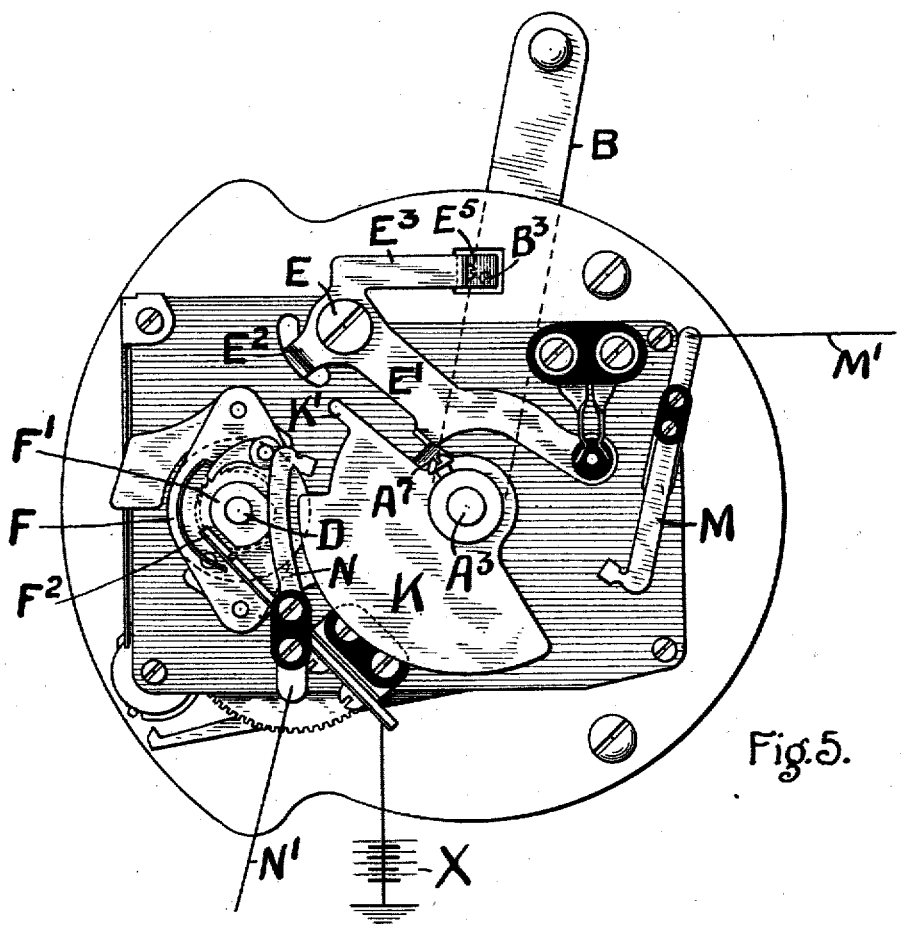
Figure 6:
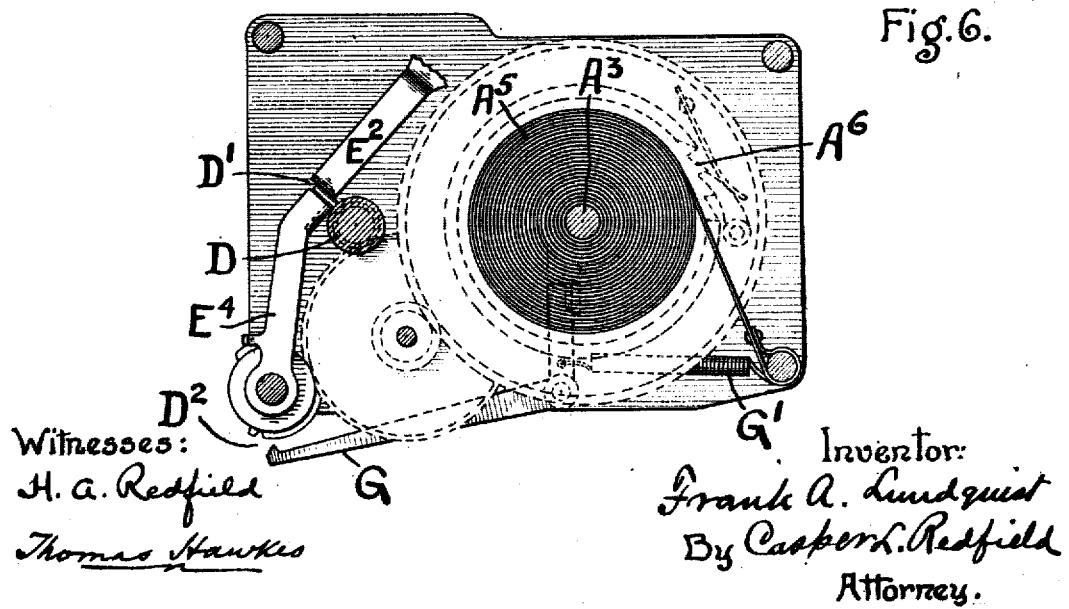

In the accompanying drawings, Figure 1 is an elevation of the telephone-box, showing the calling device in position. Fig. 2 is an elevation of the calling device with the front plate removed. Fig. 3 is a section on line 3 3 of Fig. 2. Fig. 4 is a bottom view of Fig. 2 with the front plate in position. Fig. 5 is a rear view of Fig. 2, and Fig. 6 is a view similar to Fig. 5 with the upper parts removed.

The front plate A has a series of numbers A' on one edge. Back of this is a second plate $A^2$, and between these plates are the levers B and C, mounted upon a spindle $A^3$. The lever C is fast on the spindle $A^3$ and has a pointer C' arranged to indicate different positions when moved to the numbers A' of Fig. 1. The lever B is loose on the spindle $A^3$ and has a spring B', Fig. 3, which tends to move it to the left, as shown in Figs. 1 and 2, until it is stopped by a stud $A^4$ between plates A and $A^2$. On one side of the lever B is a lug $B^2$, adapted to engage the lever C and move it forward to the right when the lever B is moved in that direction by hand.

On the spindle $A^3$ is a spring $A^5$, which is wound up by the lever C when it is moved from its normal position and which acts to return that lever to its normal position. The spindle $A^3$ is connected by a train of gears with a spindle D. In this train is a ratchet-wheel $A^6$, arranged so that the spindle D is not moved when the lever C is moved from its normal position, but is driven during the return movement of the lever under the action of spring $A^5$. On the spindle D is a pin D', which is engaged on opposite sides by arms $E^2$ and $E^4$, and by these arms and this pin the spindle is kept from turning until it is released. The arm $E^2$ is one of three arms of a lever pivoted at E, as shown in Fig. 5. The other arms are E' and $E^3$. On the spindle $A^3$ is an arm $A^7$, which when the lever C is at its normal position engages the arm E', so as to force the arm $E^2$ into the position of engaging pin D', as shown in Fig. 6. When the arm B is moved by hand from its normal position, it carries the arm C with it and turns the spindle $A^3$ so as to remove the arm $A^7$ from the arm E', so that the arm $E^2$ may be moved from pin D' when acted upon. When the lever B is released from the hand of the operator, the spring causes it to fly back to its normal position. Just as the lever B reaches its normal position a pin $B^3$ thereon strikes a flexible extension $E^5$ on the arm $E^3$ and causes the arm $E^2$ to free the pin D', so that the spring $A^5$ may return the lever C and drive the gearing connecting to spindle D. When the lever C reaches its normal position, the arm $A^7$, which is connected thereto through the spindle $A^3$, strikes the arm E and forces the end of arm E into the path of the pin D', so as to stop the rotation of the spindles D and $A^3$, the flexibility of the extension $E^5$ permitting this action when the lever B and its pin $B^3$ are in normal position. When the lever B is again advanced, the pin $B^3$ moves away from $E^5$, and thus prevents a release of D' in consequence of $A^7$ leaving E'.

On the spindle D is a governor mechanism F for regulating the speed of the spindle under the action of the spring $A^5$. Also on the spindle D is a contact-disk F', which is normally free from an insulated contact-spring $F^2$, but is adapted to make electrical connection therewith once during each rotation of the spindle D. The gearing between $A^3$ and D is so arranged that one such electrical connection is made during the time while the pointer C' is passing through the space from one number to another on the dial A'.

On the ratchet-wheel $A^6$ is a pin $A^8$, adapted to engage the inner end of a bell-crank lever G, Figs. 4 and 6, and normally hold it in the position shown. When the lever B is moved by hand, the pin $A^8$ leaves the lever G, so that the spring G' may bring the other end against the notched disk $D^2$. When the arm $E^2$ is removed from pin D', so that spindle D may rotate, said pin moves the arm $E^2$ outward. In this position the lever G engages the notch in disk $D^2$ and as $D^2$ and $E^4$ are connected together holds the arm away from pin D' until the pin $A^8$ again strikes G and lifts it from the notch.

On the plate $A^2$ is a block H, provided with a notch adapted to be engaged by a dog H' on the lever B. On the lever C is a pin $H^2$, adapted to engage a tailpiece secured to the dog H' and hold said dog from engagement with the block H. These parts are so arranged that when the levers B and C are in their normal relationship to each other the dog H' will not engage the block H, but when they are separated the dog is free to make such engagement.

The operation of the parts so far described is as follows: The operator moves the lever B from its normal position, carrying the lever C with it. This frees the lever G, but does not cause a movement of the operating parts. When the operator permits the lever B to move backward under the action of spring B', the lever C does not go back with it, but remains stationary, with the pointer C' pointing to the figure on the dial A', which represents the extreme forward position to which it was moved by the operator. This condition exists until the lever B reaches its normal position and releases the arm E² from pin D'. This in turn releases the lever C and permits it to return under action of spring A⁵, causing a series of contacts to be made by F' and F². During the time while the lever C is making this return movement the dog H' is in engagement with the block H, and the lever B cannot be moved forward to interrupt the return movement of C until C reaches its normal position and releases H' from H. More briefly stated, C is moved forward by B; but C is locked against return movement until released by B reaching normal position. When B releases C, B is locked against forward movement until released by C reaching normal position. Secured to the spindle A³ and moving therewith is a segment of a disk K, having a projection K', which is separated from the main portion by an intervening notch. At convenient points are insulated contact-springs M and N, which are normally out of engagement with the disk and its projection, but which are adapted to be engaged by them when the spindle A³ is rotated. When the lever B is advanced, the projection K' engages spring N, and immediately after leaving that spring the main body of the segment engages spring M and remains in that connection during the remainder of the forward movement. This, however, is without effect and is nothing more than setting the device for desired impulses. During the return movement the contact-maker F engages the insulated spring F² a series of times while connection is made between K and M and once while connection is between K' and N. The contact-making disk F and the segment K and its projection K' are in electrical connection with each other through the mass of the calling device. From the spring F² a wire leads to a battery X, and from the springs M and N extend the wires M' and N', which ultimately lead from the calling device to the central office. The operator moves the lever B by hand until the pointer C' points to the number on the dial A' which he wishes to call through operating his calling device. If he stops with C' pointing to "6" and releases B, then as soon as B reaches normal position C' begins to return. During this return the contact-maker F' engages spring F² six times while the pointer C' is moving from "6" to "1." Just after the pointer C' passes "1" on the dial the segment K passes from spring M, and at the time F' makes its seventh contact the projection K' engages spring N. If the pointer C' had been moved to "7" or to "8," then the number of contacts made would have been correspondingly seven or eight before K left M, with one contact as a terminal of the series made when K' engaged N. Each time that F' engages F² a current flows from the battery X through the spring F², contact-maker F', mass of the device to K. When K is in engagement with M then these impulses flow out over line M'. When K' is in engagement with N, then an impulse flows out over the line N'. The general result is that upon moving the pointer to a given number on the dial and releasing it the return movement causes as many impulses to flow over the line M' as were indicated by the pointer and also one extra impulse to flow over the line N'. The present application is for an improvement in devices for accomplishing this general result.

What I claim is—

1. In a calling device, an indicator, a hand-operated device for moving said indicator to any desired point, means by which said indicator is locked in its advanced position during the return movement of said device, and means by which said device upon reaching its normal position will release said indicator so that it may also return to its normal position.

2. In a calling device, two levers arranged to be moved simultaneously from their normal position by the hand applied to one of them, and automatically-operating means by which upon releasing said levers they will be returned independently and successively to their normal position.

3. In a calling device, the combination with an indicator, and a hand-operated device for moving it from its normal position, of means by which said device and said indicator are returned independently to their normal position, and means by which each is held in a locked position while the other is making its return movement.

4. In a calling device, two levers arranged to be moved from their normal position by hand, automatically-operating means for returning them independently and successively to their normal position, and means by which each is held in a locked position while the other is making its return movement.

5. In a calling device, a hand-operated lever, an indicator moved thereby, a spring for returning said lever to its normal position, means for holding said indicator in a locked position during such return, means by which said lever upon reaching its normal position releases said indicator so that it may also return to normal position, a contact-making device, and means by which said contact-making device is operated a predetermined number of times during the return of said indicator.

6. A numbered dial, a pointer adapted to be moved by hand to any number on said dial, automatically-operating means by which upon the operator removing his hand said pointer will remain for a short interval of time at the indicated number and then will return to its normal position, and means controlled by the return movement of said pointer for making a series of electrical contacts.

7. An indicator adapted to be set for any desired selection, automatically-operating means for holding said indicator for a brief period of time at its set position and for releasing it, a spring for returning it to a normal position when so released, and a contact-closing device operated a successive number of times by the return movement.

8. In a calling device arranged to send a desired number of impulses over one line and one additional impulse over a second line, an indicator adapted to be set for the desired number of impulses, means for temporarily locking the indicator at its set position, automatically-operating means for releasing said indicator and causing it to return to its normal position, and means by which the required impulses are sent over said lines during such return movement.

9. The combination with a numbered dial, a pointer, and a hand-operated device for moving said pointer to any number on said dial, of springs for returning said device and said pointer to their normal positions, a lock for holding said pointer in its set position while said device is returning to its normal position, means for releasing said pointer by the final part of the return movement of said device, so that the pointer may also return to normal position, and a second lock for holding said device at its normal position while said pointer is making its return movement.

10. The combination with a disk, two contact-springs normally disconnected from said disk, a contact-maker adapted to send electrical impulses to and through said disk, and a pointer connected to said disk, of a numbered dial to any number on which said pointer may be moved by hand, a spring for returning said pointer to its normal position, said disk being in connection with one or the other of said contact-springs during such return movement, means by which said contact-maker is operated during the return movement of said pointer so as to send as many impulses through one of said springs as was indicated on said dial and also one extra impulse through the other spring.

11. The combination with a contact-maker provided with a handle by means of which an operator may set said contact-maker for the making of any desired number of contacts, and means for starting said contact-maker into operation after being so set, of means for preventing the operator from manipulating the handle so as to interfere with the operation of the contact-maker during the time while it is making its contacts.

12. The combination with a contact-maker provided with a handle by which it is set, and a power device for operating said contact after being set, of a locking device for preventing the handle from interfering with the operation of said contact-maker.

Signed at Chicago, Illinois, this 3d day of February, 1905.

FRANK A. LUNDQUIST.

Witnesses:
A. L. BUCHANAN,
C. L. REDFIELD.